(12) United States Patent
Jang et al.

(10) Patent No.: US 11,353,968 B2
(45) Date of Patent: Jun. 7, 2022

(54) ELECTRONIC DEVICE AND CONTROL METHOD FOR PROVIDING DISPLAY COORDINATES ON AN EXTERNAL DISPLAY DEVICE

(71) Applicant: Samsung Electronics Co., Ltd., Gyeonggi-do (KR)

(72) Inventors: Dongho Jang, Gyeonggi-do (KR); Gajin Song, Gyeonggi-do (KR); Yongjoon Jeon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/771,445

(22) PCT Filed: Dec. 10, 2018

(86) PCT No.: PCT/KR2018/015626
§ 371 (c)(1),
(2) Date: Jun. 10, 2020

(87) PCT Pub. No.: WO2019/117566
PCT Pub. Date: Jun. 20, 2019

(65) Prior Publication Data
US 2021/0072846 A1    Mar. 11, 2021

(30) Foreign Application Priority Data
Dec. 12, 2017 (KR) .......................... 10-2017-0170215

(51) Int. Cl.
*G06F 3/0354* (2013.01)
*G06F 3/041* (2006.01)
*G06F 3/04817* (2022.01)
*G06F 3/04883* (2022.01)
*G06F 3/14* (2006.01)

(52) U.S. Cl.
CPC ........ *G06F 3/03545* (2013.01); *G06F 3/0416* (2013.01); *G06F 3/04817* (2013.01);
(Continued)

(58) Field of Classification Search
CPC .. G06F 3/04886; G06F 3/0416; G06F 3/1462; G06F 3/1423; G06F 3/038;
(Continued)

(56) References Cited

U.S. PATENT DOCUMENTS 8,063,890 B2    11/2011    Fleck
2003/0025678 A1    2/2003    Lee et al.
(Continued)

FOREIGN PATENT DOCUMENTS

EP    2 743 819    6/2014
JP    201572609    4/2015
(Continued)

OTHER PUBLICATIONS

PCT/ISA/210 Search Report issued on PCT/KR2018/015626 pp. 5.
(Continued)

*Primary Examiner* — Yaron Cohen
(74) *Attorney, Agent, or Firm* — The Farrell Law Firm, P.C.

(57) ABSTRACT

Various embodiments of the present invention relate to an electronic device and an input control method thereof. The electronic device may include: a touch screen display; a wireless communication circuit; a processor operatively coupled with the touch screen display, the wireless communication circuit, and the connector; and a memory operatively coupled with the processor. The memory may store instructions, when executed, for allowing the processor to render a screen including a plurality of icons in a set format when the electronic device is coupled with the external display device via the connector, and provide data related to the screen to the external display device, wherein the screen is adapted with a first relation in which an entire region of the touchscreen display corresponds to an entire region of the external display device or a second relation in which the
(Continued)

entire region of the touchscreen display corresponds to a partial region of the external display device. Additional various other embodiments are also possible.

20 Claims, 19 Drawing Sheets

(52) U.S. Cl.
CPC ........ *G06F 3/04883* (2013.01); *G06F 3/1423* (2013.01); *G06F 2203/04114* (2019.05)

(58) Field of Classification Search
CPC ............ G06F 3/04883; G06F 3/03545; G06F 3/0488; G06F 3/04817; G06F 2203/04114; G09G 5/391; G09G 2370/06; G09G 2354/00; G09G 5/14; G09G 2370/22; G09G 2340/0407; H04M 1/72409; H04M 2250/12
See application file for complete search history.

(56) References Cited

U.S. PATENT DOCUMENTS

| | | |
|---|---|---|
| 2011/0304557 A1 | 12/2011 | Wilburn et al. |
| 2012/0113001 A1 | 5/2012 | Yamauchi et al. |
| 2013/0305172 A1 | 11/2013 | Joshi et al. |
| 2014/0015776 A1 | 1/2014 | Kim et al. |
| 2014/0075377 A1* | 3/2014 | Kang ................ H04M 1/72409 715/788 |
| 2014/0139431 A1 | 5/2014 | Tseng et al. |
| 2014/0180481 A1* | 6/2014 | Park .................... G06F 3/03545 700/275 |
| 2015/0370351 A1 | 12/2015 | Wu et al. |

FOREIGN PATENT DOCUMENTS

| | | |
|---|---|---|
| KR | 100474724 | 3/2005 |
| KR | 1020100070092 | 6/2010 |
| KR | 1020140008985 | 1/2014 |
| KR | 1020140034100 | 3/2014 |
| KR | 1020140082187 | 7/2014 |

OTHER PUBLICATIONS

PCT/ISA/237 Written Opinion issued on PCT/KR2018/015626, pp. 6.

European Search Report dated Jan. 13, 2021 issued in counterpart application No. 18888846.5-1203, 11 pages.

Korean Office Action dated Jan. 26, 2022 issued in counterpart application No. 10-2017-0170215, 13 pages.

* cited by examiner

ELECTRONIC DEVICE AND CONTROL METHOD FOR PROVIDING DISPLAY COORDINATES ON AN EXTERNAL DISPLAY DEVICE

PRIORITY

This application is a National Phase Entry of International Application No. PCT/KR2018/015626, which was filed on Dec. 10, 2018, and claims priority to Korean Patent Application No. 10-2017-0170215, filed in the Korean Intellectual Property Office on Dec. 12, 2017, the content of each of which is incorporated herein by reference.

TECHNICAL FIELD

Various embodiments of the present invention relate to an electronic device and an input control method thereof.

BACKGROUND ART

Electronic devices (e.g., a mobile terminal, a smart phone, a wearable electronic device, etc.) may provide various functions. For example, the smart phone may provide short-range wireless communication (Bluetooth, Wireless Fidelity (Wi-Fi), Near Field Communication (NFC), etc.), mobile communication ($3^{rd}$ Generation (3G), $4^{th}$ Generation (4G), $5^{th}$ Generation (5G), etc.), a music or video playback function, an image capturing function, a navigation function, or the like.

The electronic device may be coupled with various external devices via a docking device (or directly). For example, the electronic device may be coupled with a television (TV), a monitor, an earphone, a Bluetooth headset, or the like. When coupled with the external device, the electronic device may output audio and/or video via at least one of the coupled external devices.

DISCLOSURE OF INVENTION

Technical Problem

Meanwhile, the electronic device may be coupled with an external display device (e.g., a television, a monitor, etc.) having a relatively large screen to provide an execution environment similar to a desktop Personal Computer (PC) (hereinafter, a desktop-like environment). For example, the electronic device may provide not a mobile User Interface (UI) optimized for a relatively small screen via the external display device but a UI optimized for a relatively large screen such as a PC via the external display device. The electronic device may turn the screen off, and may serve as a main body of the desktop PC. The electronic device may be used as an input device of the external display device. For example, a user may use a touch screen of the electronic device as a touch pad of a notebook computer.

Meanwhile, the electronic device may further support an input using a stylus pen (e.g., a drawing input, a writing input, etc.). However, the electronic device provides the same pen input scheme used in a mobile environment without consideration of a desktop-like environment when the external display device is coupled, which may cause inconvenience to the user when using a pen.

Various embodiments of the present invention may provide an electronic device capable of providing a pen input in consideration of an environment similar to a desktop coupled with an external display device, and an input control method thereof.

In addition, various embodiments of the present invention may provide an electronic device capable of matching an entire region or partial region of a touch screen of the electronic device and an entire region or partial region of an external display device, and an input control method thereof.

Technical Solution

An electronic device according to various embodiments of the present invention may include: a housing; a touch screen display exposed through a first portion of the housing; a wireless communication circuit; an electrical connector exposed through a second portion of the housing; a processor operatively coupled with the touch screen display, the wireless communication circuit, and the connector; and a memory operatively coupled with the processor. The memory may store instructions, when executed, for allowing the processor to: in a first operation, display a first screen including a plurality of icons indicating a plurality of application programs on the display in a first format when the electronic device is not coupled with an external display device; in a second operation, render a second screen including the plurality of icons in a second format without displaying the second screen on the display when the electronic device is coupled with the external display device via the connector, and provide data related to the second screen to the external display device via the connector so that the external display device displays the second screen; in a first mode of the second operation, receive a first touch input via the touchscreen display, determine first coordinates of the first touch input, and adapt the second screen with a first relation in which the first coordinates correspond to coordinates of an entire region of the external display device; and in a second mode of the second operation, receive a second touch input via the touchscreen display, determine second coordinates of the second touch input, and adapt the second screen with a second relation in which the second coordinates correspond to coordinates of not the entirety but part of the external display device.

A method of controlling an input of an electronic device according to an embodiment of the present invention may include: displaying a first screen including a plurality of icons indicating a plurality of application programs on a display in a first format when the electronic device is not coupled with an external display device; and rendering a second screen including the plurality of icons in a second format without displaying the second screen on the display when the electronic device is coupled with the external display device via a connector, and providing data related to the second screen to the external display device via the connector so that the external display device displays the second screen. The providing of the data related to the second screen to the external display device may include: activating a first mode to receive a first touch input via a touchscreen display, determine first coordinates of the first touch input, and adapt the second screen with a first relation in which the first coordinates correspond to coordinates of an entire region of the external display device; or activating a second mode to receive a second touch input via the touchscreen display, determine second coordinates of the second touch input, and adapt the second screen with a second relation in which the second coordinates correspond to coordinates of not the entirety but part of the external display device.

Advantageous Effects of Invention

Various embodiments of the present invention can provide a touch input and pen input in consideration of an execution environment similar to a Personal Computer (PC) environment when an external display device is coupled, thereby improving convenience of a user.

BEST MODE FOR CARRYING OUT THE INVENTION

Figure 1A:
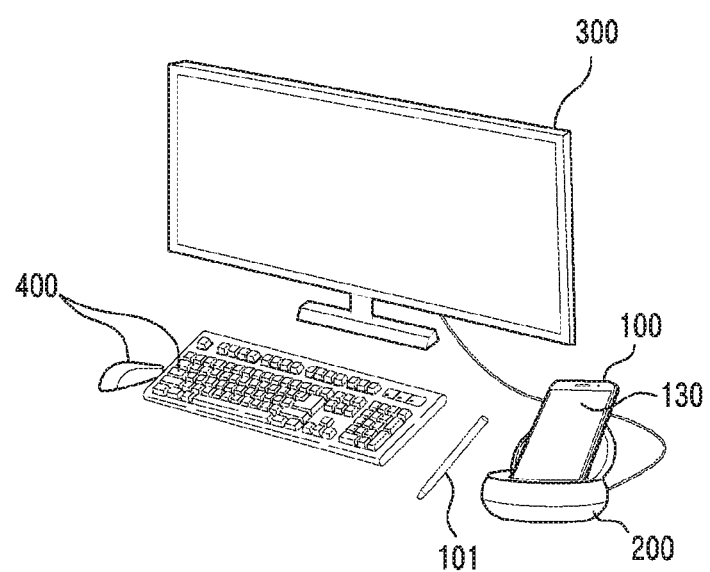
FIG. 1A and FIG. 1B illustrate a system for providing a desktop-like environment by using an electronic device according to an embodiment of the present invention.

Hereinafter, various embodiments of the present invention will be described with reference to the accompanying drawings. In the disclosure, specific embodiments are illustrated in the drawings and relevant detailed descriptions are provided, but this is not intended to limit various embodiments of the present invention to specific forms. For example, it is obvious to those skilled in the art to which the present invention belongs that embodiments of the present invention can be variously changed.

Figure 1B:
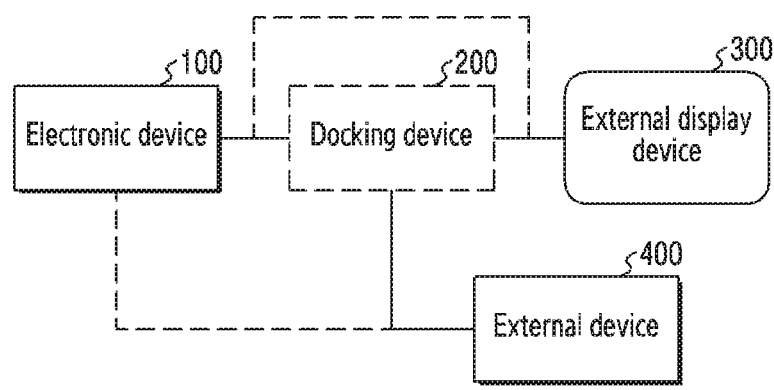

FIG. 1A and FIG. 1B illustrate a system for providing a desktop-like environment by using an electronic device according to an embodiment of the present invention.

Referring to FIG. 1A and FIG. 1B, a system according to an embodiment of the present invention may include an electronic device 100, a docking device 200, an external display device 300, and an external device 400.

The electronic device 100 according to an embodiment of the present invention may be a smart phone, wearable device, tablet Personal Computer (PC), or the like supporting a desktop extension mode. Herein, the desktop extension mode is a mode in which the electronic device 100, the docking device 200, the external display device 300, and the external device 400 are coupled to provide a usage environment (or an execution environment) similar to a typical desktop PC. For example, the electronic device 100 may serve as a main body of a typical desktop PC environment. The external display device 300 may serve as a monitor. The external device 400 may serve as an input device (e.g., a keyboard, a mouse, etc.).

The electronic device 100 according to an embodiment of the present invention may display a first screen including a plurality of icons indicating a plurality of application programs on a touchscreen display 130 in a first format, when it is not coupled with the external display device 300.

The electronic device 100 according to an embodiment of the present invention may be driven in a desktop extension mode, when it is docked to the docking device 200 coupled wiredly or wirelessly with the external display device 300 (or when it is directly coupled with the external display device 300 having the docking device 200 embedded therein). The electronic device 100 may provide a user interface similar to a Windows™ OS to the external display device 300 when driven in the desktop extension mode. For example, the electronic device 100 may render a second screen including a plurality of icons in a second format, and may provide data related to the second screen to the external display device 300 so that the external display device 300 can display the second screen. The data may be provided to the external display device 300 via the docking device 200 (or directly through a cable connector which couples the electronic device 100 and the external display device 300).

The electronic device 100 according to an embodiment of the present invention may operate as an input device for receiving a user input (e.g., an input through a touch input and/or a pen 101), without having to display a screen on the touchscreen display 130, when driven in the desktop extension mode.

The docking device 200 according to an embodiment of the present invention may be a device for docking the electronic device 100. The docking device 200 may be coupled with various external devices through wired communication and/or wireless communication. For example, the docking device 200 may be coupled wiredly or wirelessly with the external display device 300 and the external device 400 (e.g., a mouse and/or a keyboard). Although not shown in FIG. 1A and FIG. 1B, the docking device 200 may be coupled with a charger, a wired LAN, a Universal Serial Bus (USB) device, or the like.

The external display device 300 according to an embodiment of the present invention may be a display device having a relatively large screen, compared to the electronic device 100. For example, the external display device 300 may be a monitor, a television, or the like. The external display device 300 may be coupled with the docking device 200 wiredly (e.g., a High Definition Multimedia Interface (HDMI), a Display Port (DP), a Universal Serial Bus (USB) type-C) or wirelessly.

The external display device 300 according to an embodiment of the present invention may output audio and/or video provided from the electronic device 100 via the docking device 200 (or directly).

The external device 400 according to an embodiment of the present invention may be an input device (e.g., a mouse and/or a keyboard). The external device 400 may be coupled wiredly or wirelessly with the electronic device 100, or may be coupled wiredly or wirelessly with the docking device 200.

According to some embodiments, the system may further include a server (not shown) for managing a policy related to the electronic device 100. For example, the server may manage information on whether a $3^{rd}$ party application (app) and the desktop extension mode are comparable (hereinafter, compatibility information). The compatibility information may be updated by being transmitted to the electronic device 100 periodically or when the desktop extension mode is executed or when there is a user request.

According to some embodiments, the electronic device 100 may be directly coupled with the external display device 300. For example, the electronic device 100 may be directly coupled with the external display device 300 having the docking device 200 embedded therein through a wired communication circuit or a wireless communication circuit.

Figure 2:
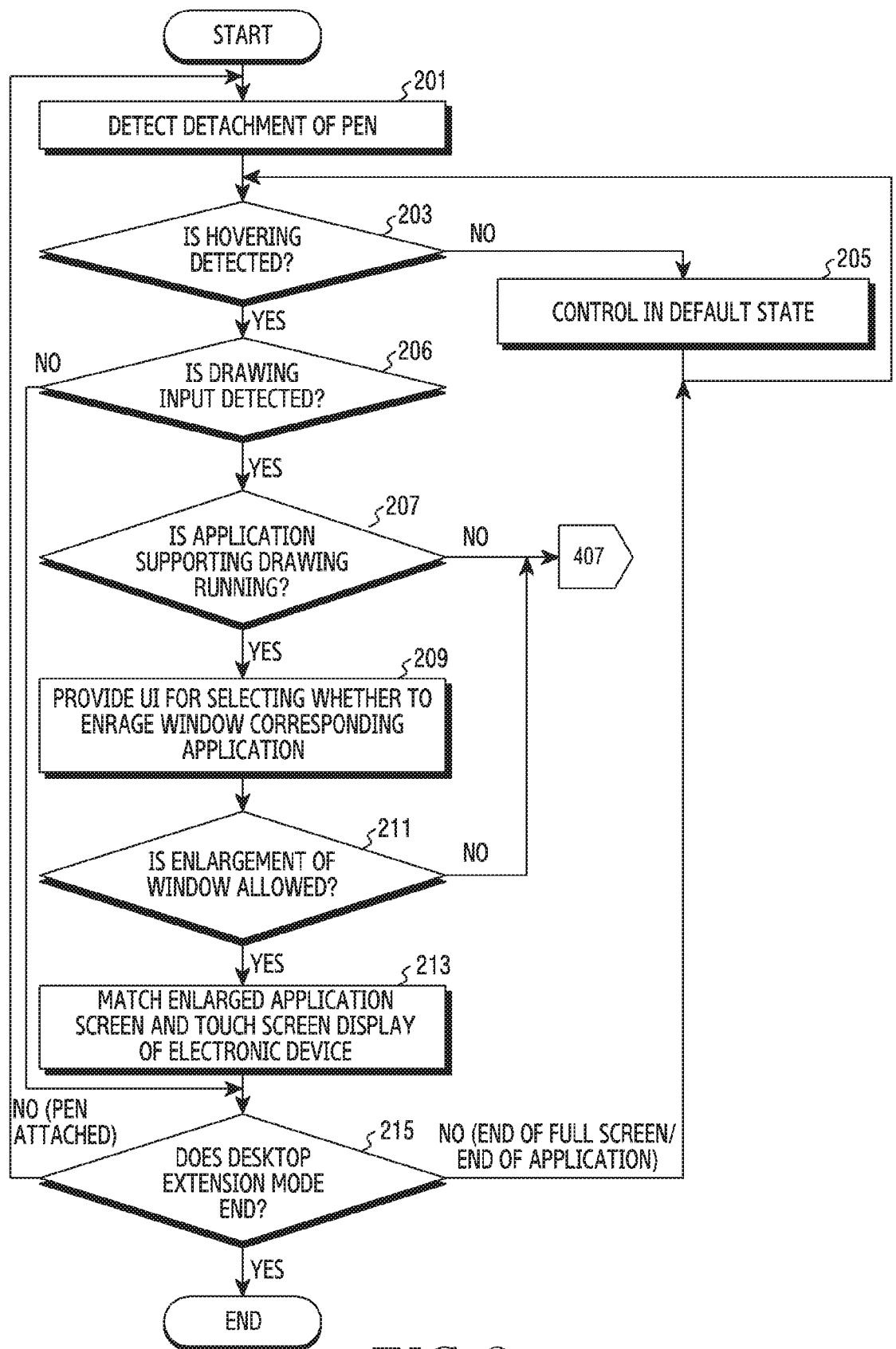
FIG. 2 is a flowchart illustrating a method of controlling a pen input of an electronic device according to an embodiment of the present invention.
Figure 3A:
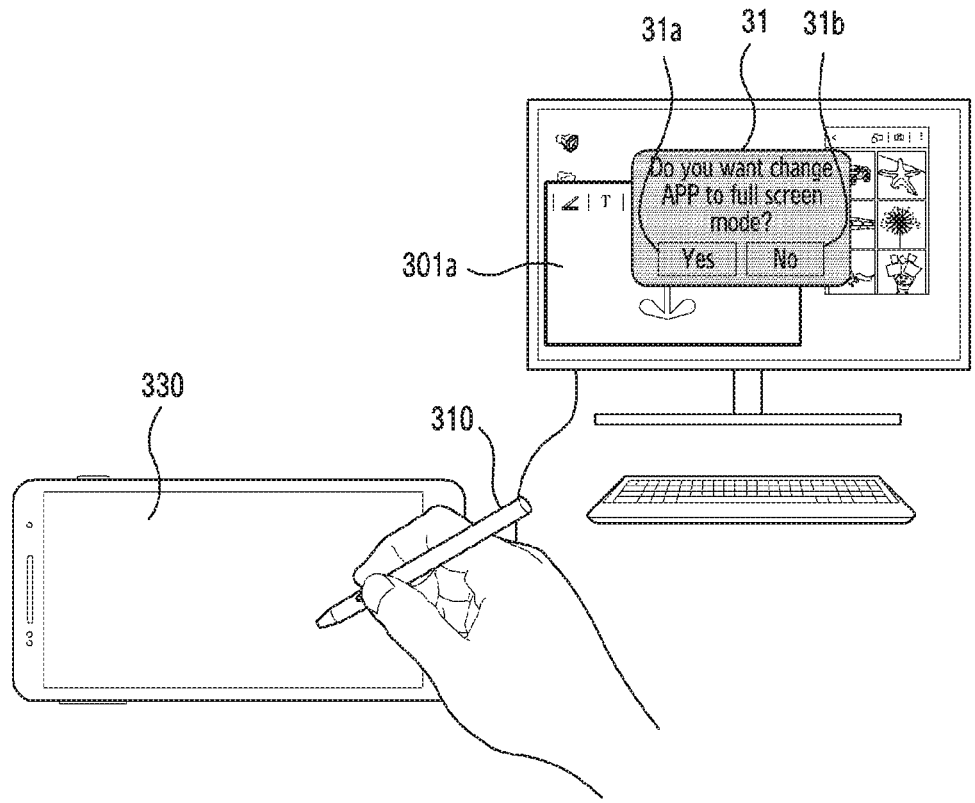
FIG. 3A to FIG. 3C are an exemplary view illustrating a method of controlling a pen input of an electronic device according to an embodiment of the present invention.
Figure 3B:
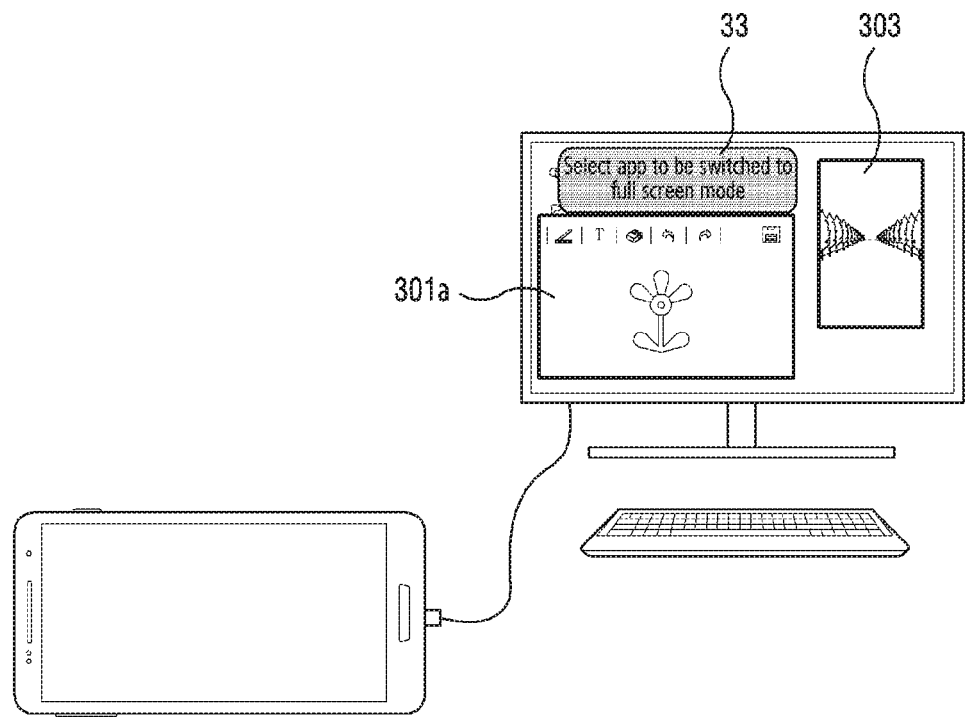
Figure 3C:
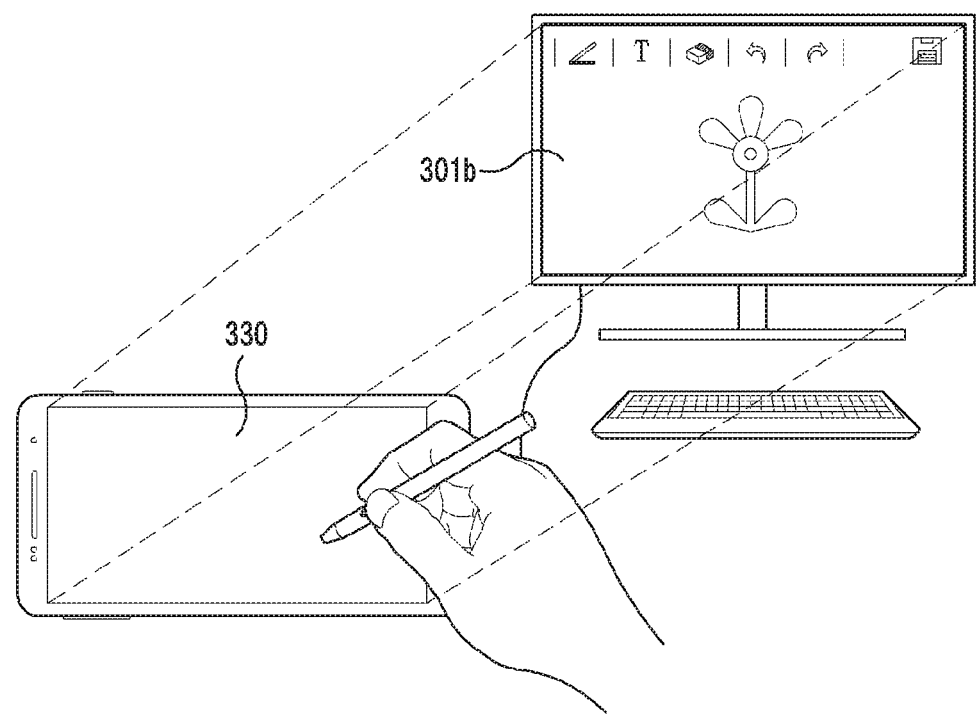

FIG. 2 is a flowchart illustrating a method of controlling a pen input of an electronic device according to an embodiment of the present invention, and FIG. 3A to FIG. 3C are exemplary views illustrating a method of controlling a pen input of an electronic device according to an embodiment of the present invention.

Before detailed descriptions, it is assumed that an electronic device (e.g., the electronic device 100 of FIG. 1A and FIG. 1B) is coupled with an external display device (e.g., the external display device 300 of FIG. 1A and FIG. 1B) to drive (or execute) a desktop extension mode. For example, the electronic device may be directly coupled wiredly or wirelessly (e.g., through a dongle) with the external display device to drive the desktop extension mode. According to some embodiments, the electronic device may be coupled with the external display device via a docking device (e.g., the docking device 200 of FIG. 1A and FIG. 1B) to drive the desktop extension mode. The docking device and the external display device may be coupled wirelessly or through a wired cable (e.g., an HDMI cable, a DP cable, a USB type-C cable, etc.) capable of transmitting a video and/or audio signal.

Referring to FIG. 2 to FIG. 3C, in operation 201, a processor of an electronic device according to an embodiment of the present invention may detect a detachment of a stylus pen 310 (e.g., the pen 101 of FIG. 1) attached to the electronic device.

In operation 203, the processor according to an embodiment of the present invention may identify whether a hovering input of the stylus pen is detected. For example, the processor may identify whether the stylus pen approaches within a set distance from a touchscreen display 330 (e.g., the touchscreen display 130 of FIG. 1A) (or whether a value of capacitance or electromagnetic field exceeds a set reference value).

If it is identified in operation 203 that the hovering input is not detected, in operation 205, the processor according to an embodiment of the present invention may control a touchscreen display in a default state (e.g., a control mode). In the default state, a user may input a command such as an execution request (e.g., a mouse click, a double click, etc.) and/or a cursor movement via the touchscreen display similarly to a touchpad of a notebook computer.

If it is identified in operation 203 that the hovering input is detected, in operation 206, the processor according to an embodiment of the present invention may further identify whether a drawing input (e.g., an input of moving the stylus pen in contact with the touchscreen display) is detected.

If it is identified in operation 206 that the drawing input is not detected, the processor may proceed to operation 215 to be described below. Otherwise, if it is identified in operation 206 that the drawing input is detected, in operation 207, the processor according to an embodiment of the present invention may identify whether at least one application (or app) supporting drawing using a stylus pen is running. According to some embodiments, the operation 203 may be omitted. For example, in an embodiment of the present invention, the operation 205 for detecting the drawing input may replace the operation 203 for detecting the hovering input.

If it is identified in operation 207 that the at least one application supporting the drawing is not running, the processor according to an embodiment of the present invention may proceed to operation 407 of FIG. 4 described below. Detailed descriptions thereof will be described below with reference to FIG. 4.

If it is identified in operation 207 that the at least one application supporting the drawing is running, in operation 209, the processor according to an embodiment of the present invention may provide a user interface capable of selecting whether a window corresponding to the running application is enlarged (e.g., a full screen mode). For example, as shown in FIG. 3A, the processor may display a popup window 31 including an allow menu 31a and deny menu 31b regarding the enlargement of the window 301a.

According to some embodiments, when a plurality of applications supporting drawing are running, as shown in FIG. 3B, the processor may display a popup window 33 at one side of a screen to request for selecting one of windows 301a and 303 corresponding to the plurality of drawing applications. The user may select one of the windows 301a and 303 corresponding to the plurality of applications by using a pointing device (e.g., a mouse, a keyboard, a pen, etc.).

In operation 211, the processor according to an embodiment of the present invention may identify whether the enlargement of the window is allowed. For example, the processor may identify whether the allow menu 3a or the deny menu 31b is selected. The selection of the allow menu 31a or the deny menu 31b may be performed by touching a region (e.g., a region corresponding to the allow menu 31a or the deny menu 31b) of the touchscreen display 330 with the stylus pen 310. According to some embodiments, the selection of the allow menu 31a or deny menu 31b may be input through another pointing device (e.g., a mouse) coupled with the electronic device or the docking device.

According to some embodiments, the processor may identify whether the window to be enlarged is selected from the plurality of windows 301a and 303.

If it is identified in operation 211 that the enlargement is denied (e.g., the deny menu 31b is selected), the processor according to an embodiment of the present invention may proceed to operation 407 of FIG. 4 described below.

If it is identified in operation 211 that the enlargement is allowed (e.g., the allow menu 31a is selected), in operation 213, the processor according to an embodiment may match (or map) an application window enlarged to a full screen and the touchscreen display of the electronic device. For example, as shown in FIG. 3C, the processor may enlarge the window 301a displaying a first application screen to a full screen 301b, and may match the screen such that the full screen 301b of the external display device corresponds to the full screen of the touchscreen display 330. According to some embodiments, the processor may match the screen such that the window 301a corresponds to the full screen of the touchscreen display, without having to enlarge the window 301a to the full screen. Detailed descriptions thereof will be described below with reference to FIG. 6A and FIG. 6B.

In operation 215, the processor according to an embodiment of the present invention may identify whether the desktop extension mode ends. For example, the processor may identify whether the electronic device and the external display device are decoupled.

If it is identified in operation 215 that the desktop extension mode does not end, the processor may return to any one of the aforementioned operations. For example, the processor may return to operation 201 when the stylus pen 310 is attached to a recess of the electronic device. When a drawing application ends or a full screen mode ends, the processor may return to operation 205.

Otherwise, if it is identified in operation 215 that the desktop extension mode ends, the processor may end the aforementioned pen input procedure.

According to some embodiments, operations 203 and 207 may be omitted. For example, the processor may directly proceed to operation 209 after operation 201 is performed. In operation 209, the processor may provide a UI for selecting whether to enlarge a window corresponding to a currently running application. According to some embodiments, the processor may provide a UI capable of selecting any one of the at least one drawing application which is installed (or which can be provided) in the electronic device.

According to some embodiments, operations 209 and 211 may be omitted. For example, if it is identified in operation 207 that one application supporting the drawing is running, the processor may directly proceed to operation 213.

Figure 4:
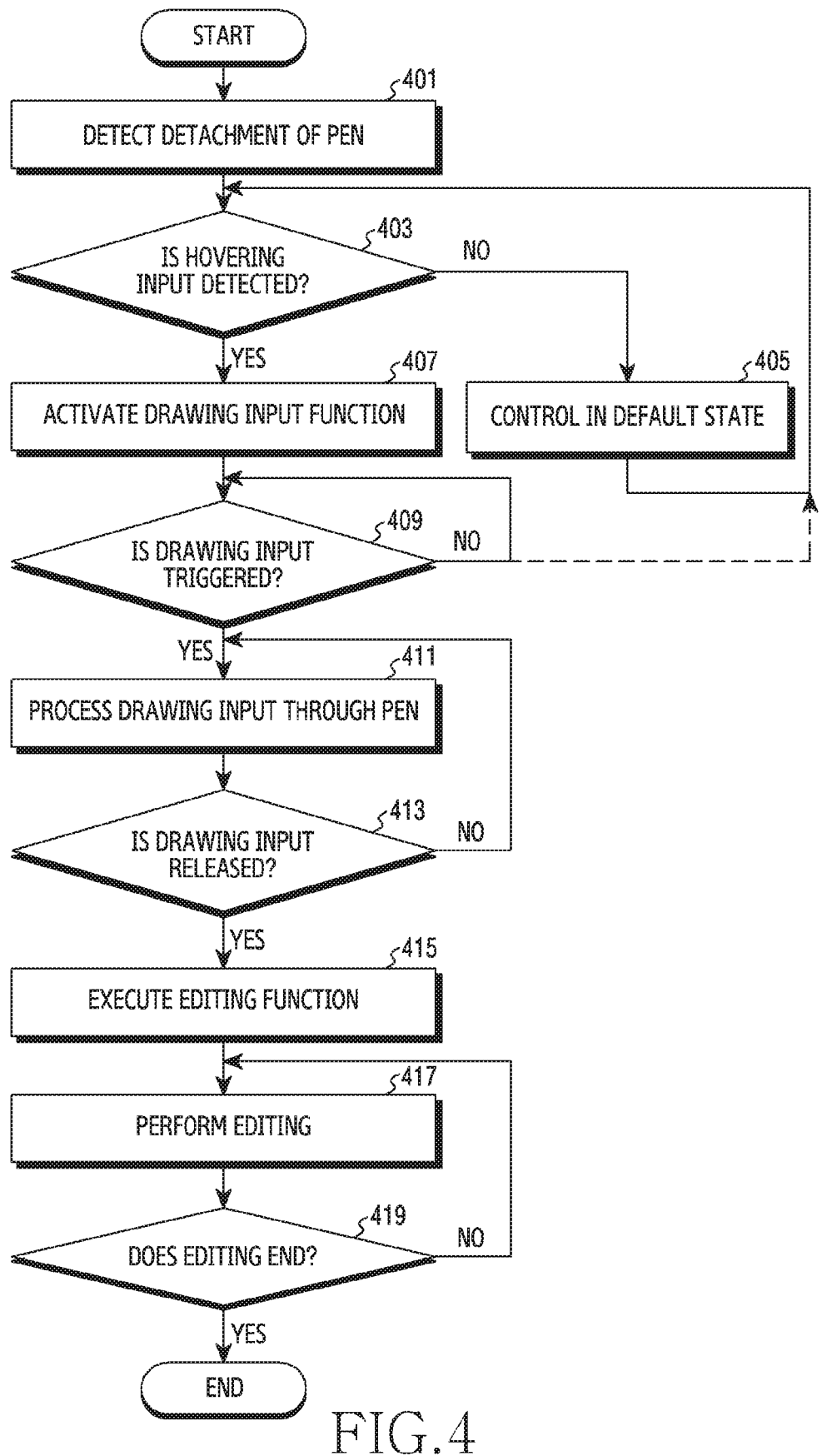
FIG. 4 is a flowchart illustrating a method of controlling a pen input of an electronic device according to an embodiment of the present invention.
Figure 5A:
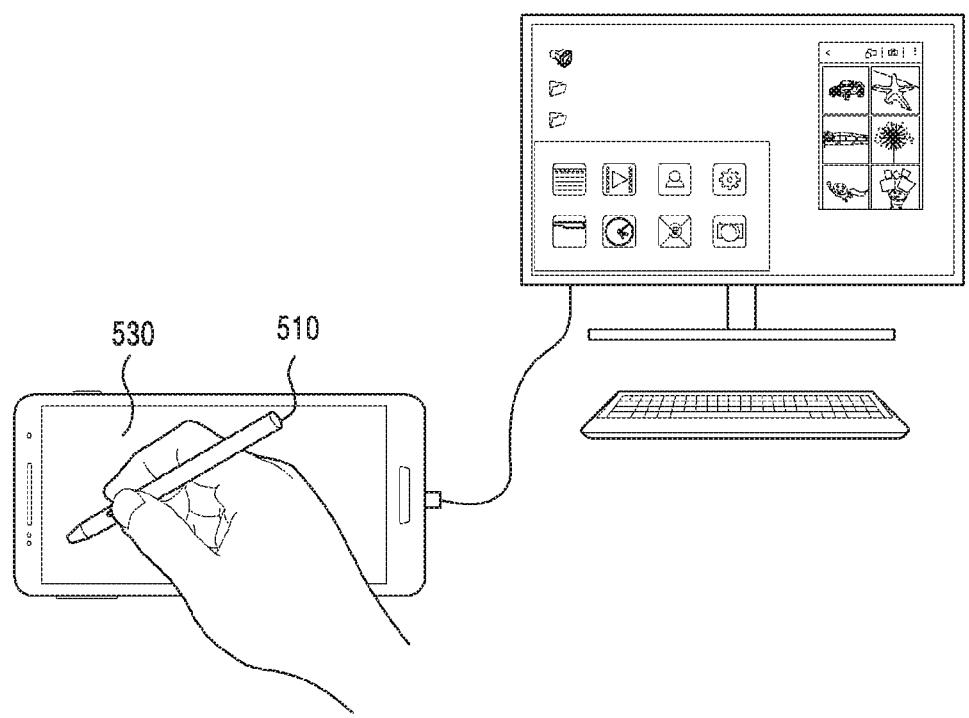
FIG. 5A to FIG. 5C are an exemplary view illustrating a method of controlling a pen input of an electronic device according to an embodiment of the present invention.
Figure 5B:
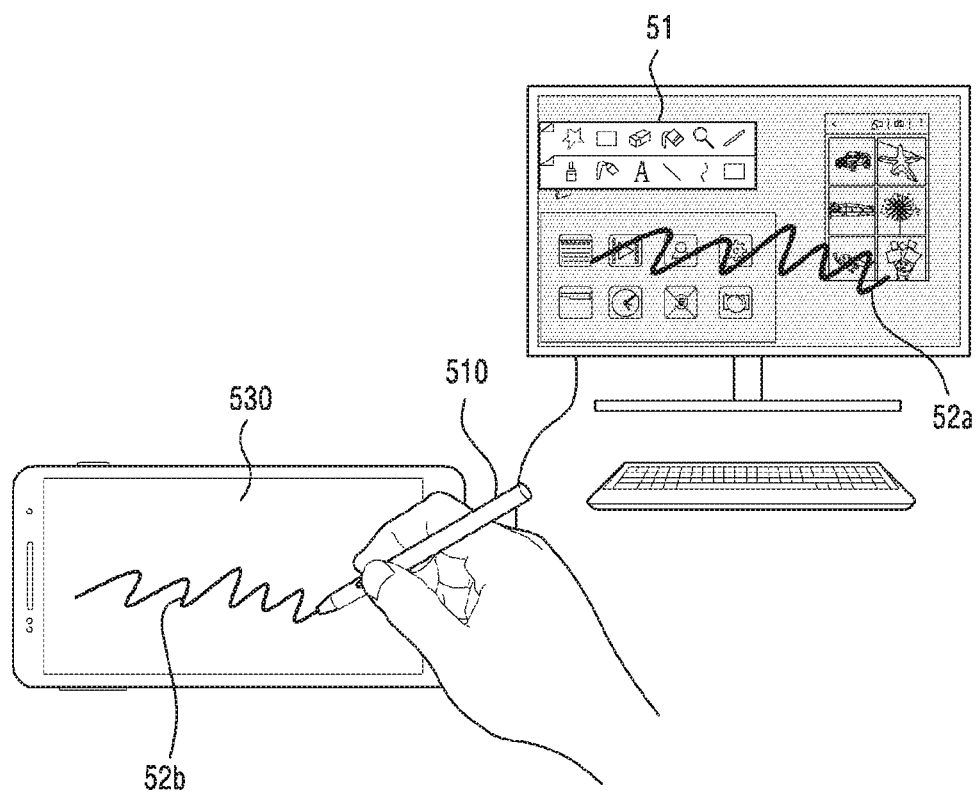
Figure 5C:
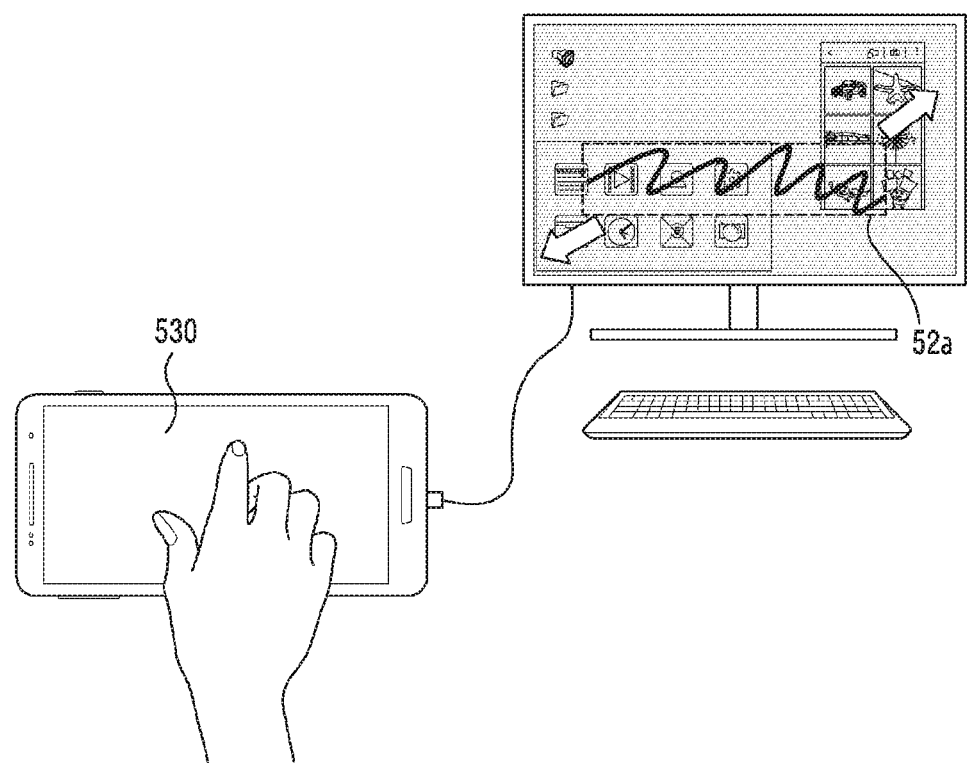

FIG. 4 is a flowchart illustrating a method of controlling a pen input of an electronic device according to an embodiment of the present invention, and FIG. 5A to FIG. 5C are exemplary views illustrating a method of controlling a pen input of an electronic device according to an embodiment of the present invention.

Before detailed descriptions, it is assumed that an electronic device (e.g., the electronic device 100 of FIG. 1A and FIG. 1B) is coupled wiredly or wirelessly with an external display device (e.g., the external display device 300 of FIG. 1A and FIG. 1B) to drive (or execute) a desktop extension mode.

Referring to FIG. 4 to FIG. 5C, in operation 401, a processor of an electronic device according to an embodiment of the present invention may detect a detachment of a stylus pen (e.g., the pen 101 of FIG. 1) attached to the electronic device.

In operation 403, the processor according to an embodiment of the present invention may identify whether a hovering input of the stylus pen is detected. For example, as shown in FIG. 5A, the processor may identify whether a stylus pen 510 approaches within a set distance from a touchscreen display 530 (e.g., the touchscreen display 130 of FIG. 1A) (or whether a value of capacitance or electromagnetic field exceeds a set reference value).

If it is identified in operation 403 that the hovering input is not detected, in operation 405, the processor according to an embodiment of the present invention may control a touchscreen display in a default state (e.g., a control mode). In the default state, a user may input a command such as an execution request (e.g., a mouse click, a double click, etc.) and/or a cursor movement via the touchscreen display similarly to a touchpad of a notebook computer.

If it is identified in operation 403 that the hovering input is detected, in operation 407, the processor according to an embodiment of the present invention may activate a drawing input function (or mode). The drawing input function may use a pen to display information which is input on the touchscreen display of the electronic device on a screen of the external display device in a drawing format. The processor may visually notify the user that the drawing input function is activated. For example, when the drawing input function is activated, as shown in FIG. 5B, the processor may perform dimming processing on the screen displayed on the external display device, and may display a drawing tool 51 at one side of the screen to set a line type (straight line, curved line, dotted line, solid line, etc.), thickness, color, pen point type, or the like.

According to some embodiments, an operation of identifying whether at least one application (or app) supporting drawing using a stylus pen is running may be further included before performing operation 407. If the at least one application supporting the drawing is not running, the processor may proceed to operation 407. If the at least one application supporting the drawing is running, the processor may proceed to operation 209 of FIG. 2 described above.

In operation 409, the processor according to an embodiment may identify whether a drawing input is triggered. For example, the processor may identify whether a stylus pen is moved by at least a set distance (e.g., 0.3 cm) in contact with the touch screen display.

If it is identified in operation 409 that the drawing input is not triggered, the processor according to an embodiment of the present invention may maintain operation 409. According to some embodiments, if the drawing input is not triggered for at least a specific time, the processor may proceed to operation 405.

If it is identified in operation 409 that the drawing input is triggered, in operation 411, the processor according to an embodiment of the present invention may process a drawing input through a pen. For example, as shown in FIG. 5B, the processor may display a first line 52a corresponding to a movement of the stylus pen 510 to the external display device, when the stylus pen 510 freely moves on the touchscreen display 530. Although it is shown in FIG. 5B that a second line 52b is displayed on the touchscreen display 530 in response to the movement of the pen 510, according to some embodiments, the second line 52b may not be displayed on the touchscreen display 530. For example, an output function (a screen display function) of the touchscreen display 530 may be deactivated, and only an input function may be activated.

In operation 413, the processor according to an embodiment of the present invention may identify whether the drawing input is released. For example, the processor may identify whether an input using an input tool (e.g., a finger) other than the stylus pen is detected, or whether an input using the stylus pen is not detected for at least a specific time.

If it is identified in operation 413 that the drawing input is not released, the processor according to an embodiment of the present invention may return to operation 411. If it is identified in operation 413 that the drawing input is released, in operation 415, the processor according to an embodiment of the present invention may execute an editing function.

According to some embodiments, if the electronic device includes a plurality of editing applications, the processor may provide (display) a user interface capable of selecting a specific editing application at one side of the external display device.

In operation 417, the processor according to an embodiment of the present invention may perform editing. For example, as shown in FIG. 5C, the processor may enlarge a size of the first line 52a on the external display device in response to a user input (e.g., a stretch gesture) detected on the touchscreen display 530. The size enlargement of FIG. 5C is for exemplary purposes only, and embodiments of the present invention are not limited thereto. For example, the processor may perform editing in various manners such as a size decrease, a color change, a line type change, a location movement, or the like according to a user's request.

In operation 419, the processor according to an embodiment of the present invention may identify whether the editing ends. For example, the processor may identify whether an input is not received for at least a designated specific time (e.g., 3 seconds). Alternatively, the processor may identify whether a set gesture (e.g., a double tap, a gesture of drawing a circle, etc.) is input.

If it is identified in operation 419 that the editing does not end, the processor may return to operation 417. Otherwise, if it is identified in operation 419 that the editing ends, the processor may end the aforementioned pen input procedure.

According to some embodiments, orders of operations 407 and 409 may be changed. For example, the processor may identify whether a drawing input is triggered (operation 409) if a hovering input is detected, and may activate the drawing input function (operation 407) if the drawing input is triggered.

Figure 6A:
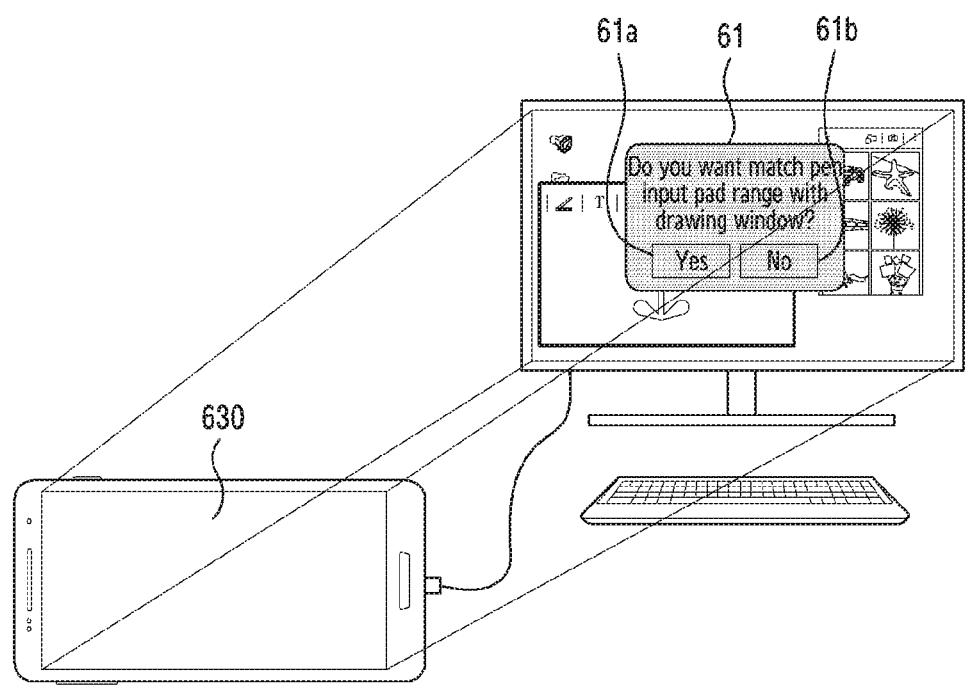
FIG. 6A to 6C are an exemplary view illustrating a method of controlling a pen input of an electronic device according to an embodiment of the present invention.
Figure 6B:
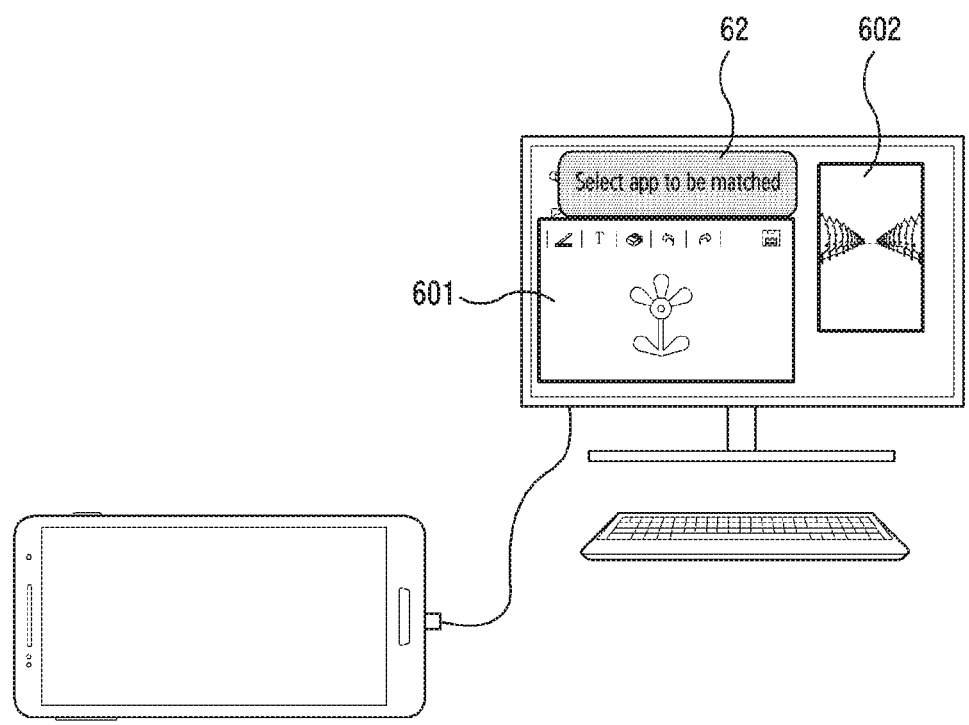
Figure 6C:
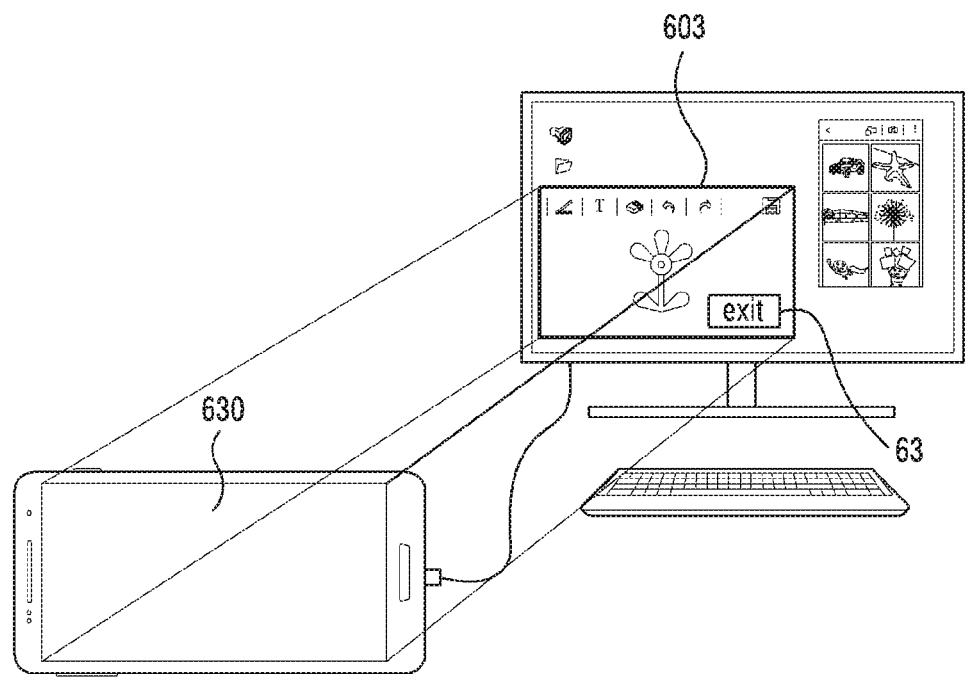

FIG. 6A to FIG. 6C are exemplary views illustrating a method of controlling a pen input of an electronic device according to an embodiment of the present invention.

Referring to FIG. 6A to FIG. 6C, an electronic device (e.g., the electronic device 100 of FIG. 1A and FIG. 1B) according to an embodiment of the present invention may match an entire region of a touchscreen display with a partial region (e.g., a window region for displaying a drawing application screen) of an external display device. For example, as shown in FIG. 6A, upon detecting a detachment of a pen in a desktop extension mode or upon detecting hovering of the pen, the electronic device may display a selection UI 61 including an allow menu 61a and deny menu 61b regarding whether the matching is achieved, at one side of the external display device. Although the selection UI 61 shown in a popup format in FIG. 6A, this is exemplary purposes only. Therefore, embodiments of the present invention are not limited thereto, and the selection UI 61 may be provided in various manners.

According to some embodiments, when a plurality of drawing applications are running, as shown in FIG. 6B, the processor may provide a UI 62 to request for selecting a window to be matched from windows 601 and 602 corresponding to the plurality of applications. A user may select one of the plurality of windows 601 and 602 by using a pointing device (e.g., a mouse, a keyboard, a pen, etc.).

When the allow menu 61a of the selection UI 61 is selected in a state of FIG. 6A, as shown in FIG. 6C, the processor may match an entire region of a window 603 of the running drawing application and an entire region of the touchscreen display 630. The window 603 of the application may include a cancel menu 63 at one side to restore a current matching relation to a previous state. For example, if the cancel menu 63 is selected, the processor may return to the state of FIG. 6A. According to some embodiments, when the cancel menu 63 is selected, a selection UI may be displayed to inquire whether to select another application to be matched among a plurality of application or to return to a previous state (e.g., the state of FIG. 6A).

In a state where an entire region of the external display device is matched with the entire region of the touchscreen display 630, a pen input on the window 603 may be inconvenient when a size of the window 603 is small. However, since a matching relation is changed to match the window 603 and the entire region of the touchscreen display 630 in the aforementioned embodiment of the present invention, the user may easily perform the pen input on the window 603.

Figure 7:
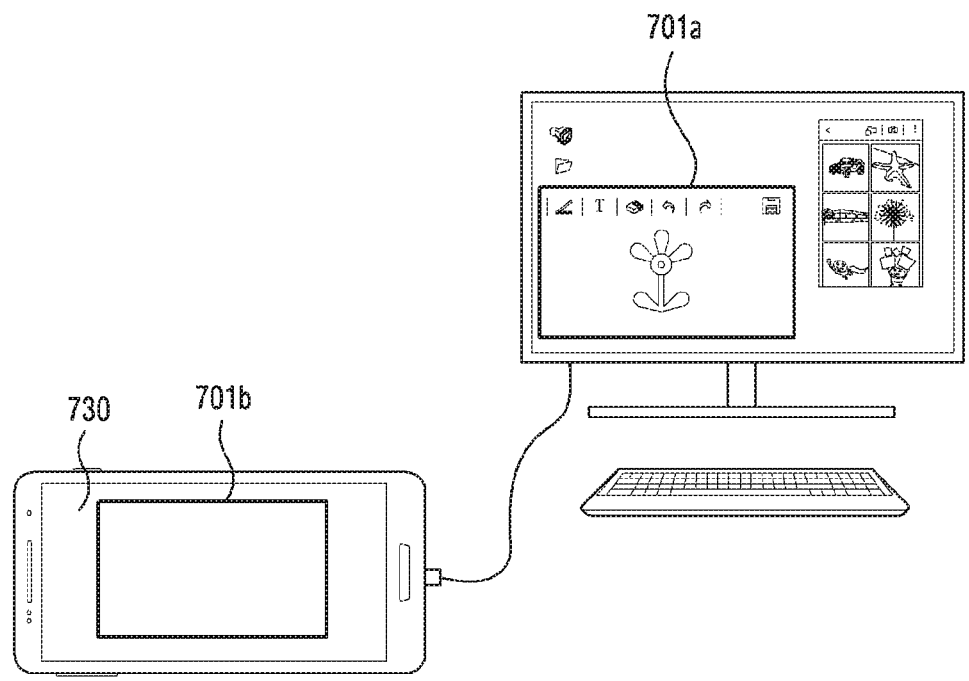
FIG. 7 is an exemplary view illustrating a method of controlling a pen input of an electronic device according to an embodiment of the present invention.

FIG. 7 is an exemplary view illustrating a method of controlling a pen input of an electronic device according to an embodiment of the present invention.

Referring to FIG. 7, an electronic device (e.g., the electronic device 100 of FIG. 1A and FIG. 1B) according to an embodiment of the present invention may adjust a ratio of an input range of a touchscreen display to be equal to a ratio of a matched window. For example, as shown in FIG. 7, the electronic device may match a window 701a of an external display device and a partial region of a touchscreen display 730. The partial region of the touchscreen display 730 may be set to a maximum size having the same ratio as a horizontal and vertical ratio of the window. In addition, the electronic device may display guide information (e.g., a square box 701b) on the touchscreen display 730 so that a user can recognize the partial region matched to the window 701a. The guide information of FIG. 7 is for exemplary purposes only, and embodiments of the present invention are not limited thereto. For example, the electronic device may display the matched partial region and a different region in different background color, transparency, or the like.

The electronic device according to an embodiment of the present invention may ignore a pen input detected from the different region of the touchscreen display 730.

Upon detecting a rotation of the electronic device in a vertical direction, the electronic device may re-adapt the set input region suitable for a vertical screen.

Figure 8:
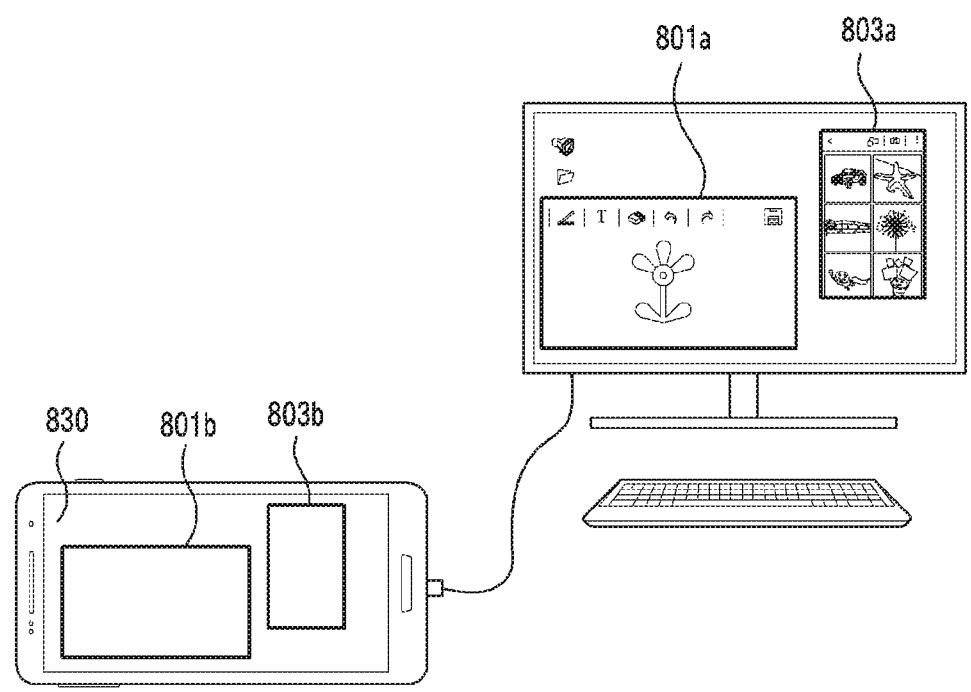
FIG. 8 is an exemplary view illustrating a method of controlling a pen input of an electronic device according to an embodiment of the present invention.

FIG. 8 is an exemplary view illustrating a method of controlling a pen input of an electronic device according to an embodiment of the present invention.

Referring to FIG. 8, an electronic device (e.g., the electronic device 100 of FIG. 1A and FIG. 1B) according to an embodiment of the present invention may set a plurality of input regions in a touchscreen display. For example, as shown in FIG. 8, the electronic device may set input regions 801b and 803b corresponding to windows 801a and 803a of a plurality of running drawing applications on a touchscreen display 830.

Upon detecting a rotation in a vertical direction, the electronic device may re-adapt the set input region suitable for a vertical screen.

It is described above with reference to FIG. 7 and FIG. 8 that the input regions 801b and 803b of the touchscreen display 830 are set based on a window size and ratio. According to some embodiments, a user may randomly designate a size of the input regions 801b and 803b of the touchscreen display 830. For example, when the user selects a partial region of a running drawing application after executing an input region set menu, the processor may set at least a partial region of the touchscreen display 830 by considering a size or ratio of the selected partial region. According to some embodiments, the processor may adjust a horizontal and/or vertical size of an input region of the touchscreen display 830 in response to the user input. The processor may increase or decrease a size of the input region of the touchscreen display 830 matched in association with a window size of the selected application, for example, based on a user's pinch zoom-in or out. As such, in an embodiment of the present invention, the window of the selected application and the input region of the touchscreen display 830 may have different ratios.

Figure 9:
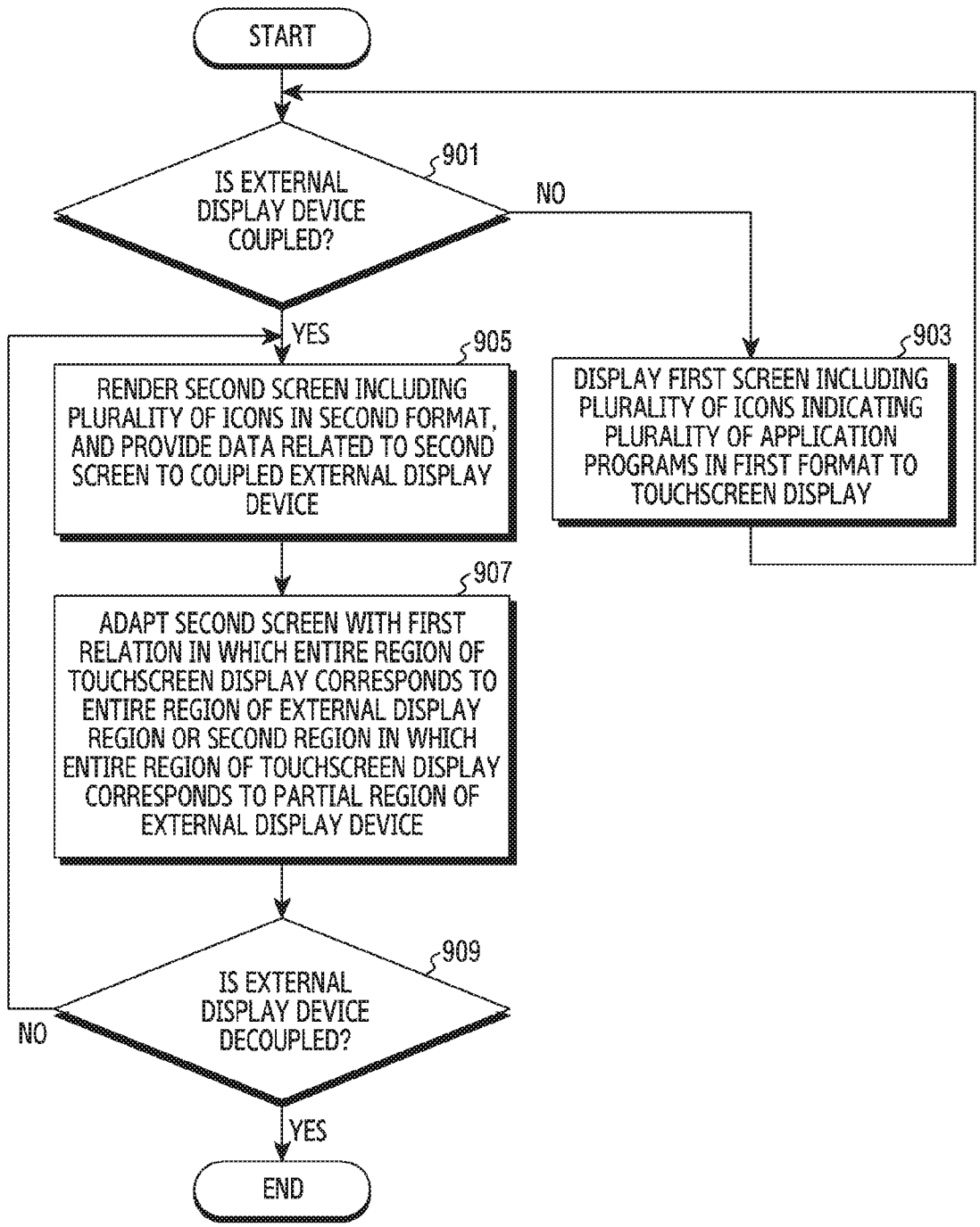
FIG. 9 is a flowchart illustrating a method of controlling an input of an electronic device according to an embodiment of the present invention.

FIG. 9 is a flowchart illustrating a method of controlling an input of an electronic device according to an embodiment of the present invention.

Referring to FIG. 9, in operation 901, an electronic device (e.g., the electronic device 100 of FIG. 1A and FIG. 1B) according to an embodiment of the present invention may identify whether an external display device (e.g., the external display device 300 of FIG. 1A and FIG. 1B) is coupled. For example, the electronic device may be directly coupled with the external display device wiredly or wirelessly, or may be coupled indirectly with the external display device via a docking device (e.g., the docking device 200 of FIG. 1A and FIG. 1B).

If it is identified in operation 901 that the external display device is not coupled, in operation 903, the processor may display a first screen including a plurality of icons indicating a plurality of application programs in a first format on a touchscreen display (e.g., the touchscreen display 130 of FIG. 1A, the touchscreen display 330 of FIG. 3A to FIG. 3C, the touchscreen display 530 of FIG. 5A to FIG. 5C, the touchscreen display 630 of FIG. 6A and FIG. 6B, the touchscreen display 730 of FIG. 7, the touchscreen display 830 of FIG. 8).

If it is identified in operation 901 that the external display device is coupled, in operation 905, the processor may render a second screen including a plurality of icons in a second format, and may provide data related to the second screen to the coupled external display device. For example, the processor may drive (or execute) a desktop extension mode upon detecting a connection of the external display device, and may provide the data related to the second screen to the coupled external display device. The data related to the second screen may be data for rendering a home screen of the desktop extension mode on the external display device. According to some embodiments, the processor may drive the desktop extension mode in response to receiving of a user input (e.g., a touch on a menu or icon or the like) for driving the desktop extension mode.

In operation 907, the processor according to an embodiment of the present invention may adapt the second screen with a first relation in which an entire region of the touchscreen display corresponds to an entire region of the external display region or a second region in which the entire region of the touchscreen display corresponds to a partial region of the external display device. For example, the processor may receive a first touch input via the touchscreen display, determine first coordinates of the first touch input, and drive (activate) a first mode for adapting the second screen with a first relation in which the first coordinates correspond to coordinates of the entire region of the external display device. As shown in FIG. 3C, in the first mode, the window 301b of the selected application may be displayed in a full screen, and the window 301b of the selected application is matched with an entire region of the touchscreen display 330 to support a drawing input using a pen.

Alternatively, the processor may receive a second touch input via the touchscreen display, determine second coordinates of the second touch input, and drive (activate) a second mode for adapting the second screen with a second relation in which the second coordinates correspond to coordinates of not the entirety but part of the external display device. As shown in FIG. 6C, in the second mode, a window 603 of an application displayed not in a full screen but in a partial region is matched with the entire region of the touchscreen display 630 to support a drawing input using a pen.

In operation 909, the processor according to an embodiment of the present invention may identify whether the external display device is decoupled. If it is identified in operation 909 that the external display device is not decoupled, the processor may return to operation 905. If it is identified in operation 909 that the external display device is decoupled, the processor may end the input control procedure.

According to some embodiments, upon receiving a gesture input via the touchscreen display, the processor according to an embodiment of the present invention may switch the first mode to a third mode. As shown in FIG. 5B, in the third mode, a figure (e.g., a curved line) corresponding to the gesture input using the pen may be displayed on a screen (e.g., the second screen) displayed on the external display device. For example, the processor may add a separate window layer on the screen and match an entire region of the added window layer and the entire region of the touchscreen display 330 to support a drawing input using a pen.

The processor may adjust a transparency of a window layer added to the external display device to visually notify the user that the drawing input function is activated, or perform dimming processing on a screen for displaying a running application. In addition, the processor may display a drawing tool (e.g., 51 of FIG. 5B) at one side of the screen to set a line type (straight line, curved line, dotted line, solid line, etc.), thickness, color, pen point type, or the like.

According to various example embodiments of the present invention, a method of controlling an input of an electronic device (e.g., the electronic device 100 of FIG. 1A and FIG. 1B) may comprise: displaying a first screen including a plurality of icons indicating a plurality of application programs on a display in a first format when the electronic device is not coupled with an external display device (e.g., the external display device 300 of FIG. 1A and FIG. 1B); and rendering a second screen including the plurality of icons in a second format without displaying the second screen on the display when the electronic device is coupled with the external display device via a connector, and providing data related to the second screen to the external display device via the connector so that the external display device displays the second screen. The providing of the data related to the second screen to the external display device may comprise: activating a first mode to receive a first touch input via a touchscreen display (e.g., the touchscreen display 130 of FIG. 1A and FIG. 1B, the touchscreen display 330 of FIG. 3A to FIG. 3C, the touchscreen display 530 of FIG. 5A to FIG. 5C, the touchscreen display 630 of FIG. 6A and FIG. 6B, the touchscreen display 730 of FIG. 7, the touchscreen display 830 of FIG. 8), determine first coordinates of the first touch input, and adapt the second screen with a first relation in which the first coordinates correspond to coordinates of an entire region of the external display device; or activating a second mode to receive a second touch input via the touchscreen display, determine second coordinates of the second touch input, and adapt the second screen with a second relation in which the second coordinates correspond to coordinates of not the entirety but part of the external display device.

According to various example embodiments, the method may further comprise switching the first mode to a third mode upon receiving a gesture input via the touchscreen display.

According to various example embodiments, the gesture input may be provided using a stylus pen (e.g., the stylus pen 101 of FIG. 1A, the stylus pen 310 of FIG. 3A, the stylus pen 510 of FIGS. 5A and 5B).

According to various example embodiments, the method may further comprise displaying a user interface of a drawing application program at a partial region of the external display device; and switching the first mode to the second mode.

According to various example embodiments, the method may further comprise: receiving a first user input for selecting the second mode via the touchscreen display and switching the first mode to the second mode upon receiving the first user input.

According to various example embodiments, the method may further comprise: receiving a second user input for selecting the first mode via the touchscreen display and switching the second mode to the first mode upon receiving the second user input.

According to various example embodiments, the method may further comprise: determining whether the stylus pen is detached from a recess constructed at a housing of the electronic device; and switching the first mode to the second mode, based in part on the determination.

According to various example embodiments, the method may further comprise: displaying a user interface of a drawing application program at a partial region of the external display device; identifying whether to enlarge the user interface to a full screen; and enlarging the user interface to a full screen, in response to allowing of the enlargement.

According to various example embodiments, the method may further comprise: displaying a user interface of a drawing application program at a partial region of the external display device; and setting a partial region of the touch screen display as an input region, by considering a ratio of a horizontal size and vertical size of the user interface.

According to various example embodiments, the method may further comprise: displaying guide information indicating the set input region on the touchscreen display.

Figure 10A:
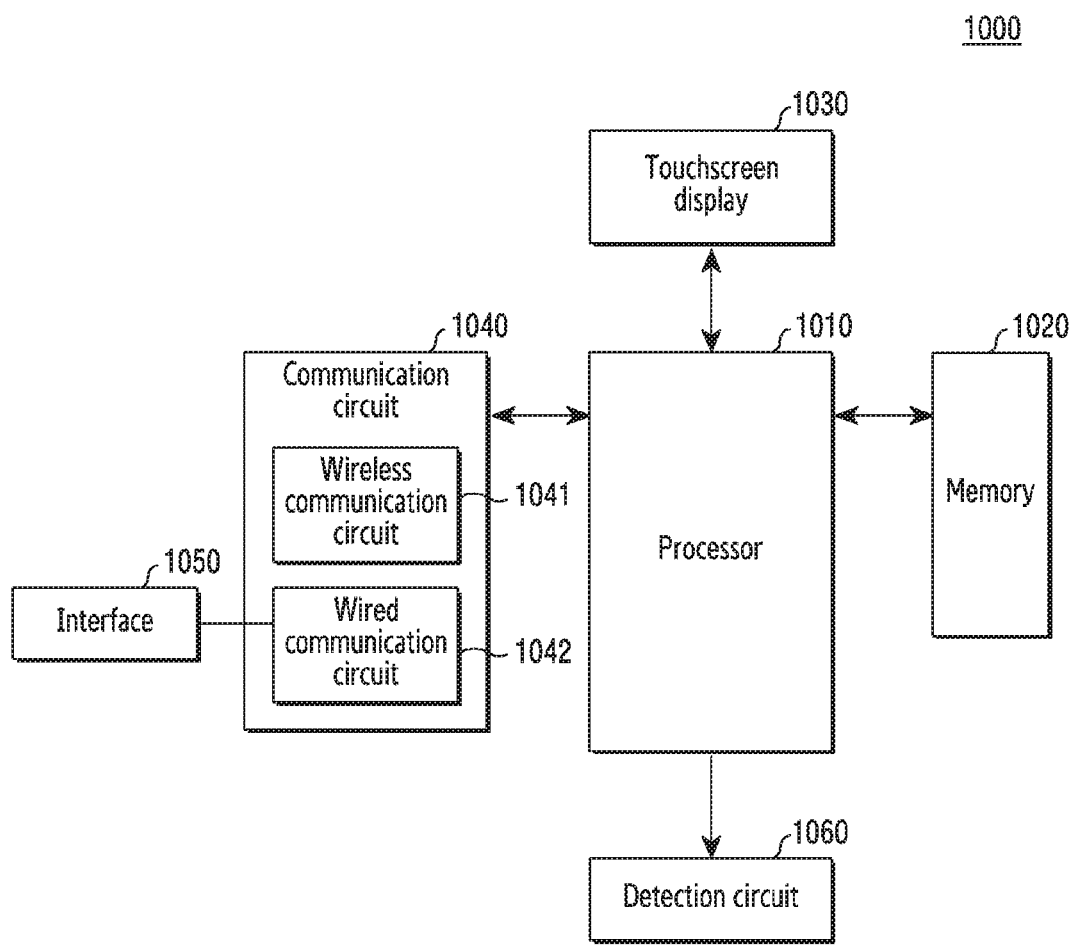
FIG. 10A is a block diagram illustrating a structure of an electronic device according to an embodiment of the present invention.
Figure 10B:
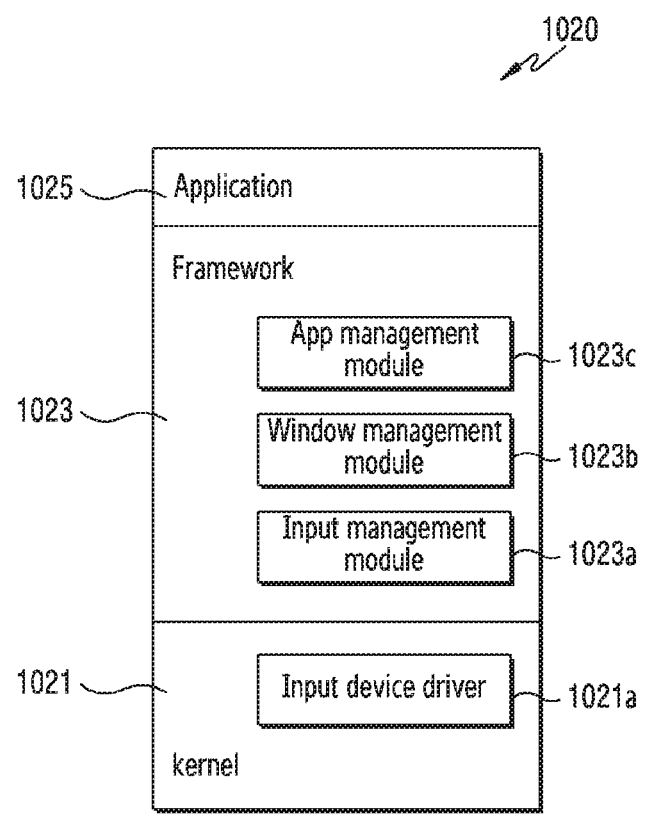
FIG. 10B is a block diagram of a program module according to various embodiments of the present invention.

FIG. 10A is a block diagram illustrating a structure of an electronic device according to an embodiment of the present invention, and FIG. 10B is a block diagram of a program module according to various embodiments of the present invention.

Referring to FIG. 10A and FIG. 10B, an electronic device 1000 (e.g., the electronic device 100 of FIG. 1A and FIG. 1B) according to an embodiment of the present invention may include a processor 1010, a memory 1020, a touchscreen display 1030, a communication circuit 1040, an interface 1050, and a detection circuit 1060. The electronic device 1000 may include a plurality of electronic components inside a housing constructing an exterior. The housing may be constructed of at least one of plastic, glass, and metal.

The processor 1010 may control an overall operation of the electronic device 1000. For example, the processor 1010 may be located inside the housing and may be electrically (or operatively) coupled with the touchscreen display 1030, the communication circuit 1040, the detection circuit 1060, and the memory 1020 to control each of the component of the electronic device 1000. The processor 1010 may receive instructions from the memory 1020, and may perform various functions by controlling each of the components according to the received instructions. The processor 1010 may be a Central Processing Unit (CPU), an Application Processor (AP), a Micro Control Unit (MCU), a Micro Processor Unit (MPU), or the like. The processor 1010 may be a single-core processor or a multi-core processor. In another embodiment, the processor 1010 may be a multi-processor consisting of a plurality of processors. For example, the processor 1010 may include an Application Processor (AP) and a Communication Processor (CP). In another embodiment, the processor 1010 may include a high-power processor (e.g., AP) and a low-power processor (e.g., MCU, MPU), The processor 1010 according to various embodiments of the present invention may control a pen input in a desktop extension mode. For example, the processor 1010 may control various procedures for the aforementioned pen input control.

The memory 1020 may be located inside the housing, and may be electrically (or operatively) with the processor 1010. The memory 1020 may store various programs for operating the electronic device 1000, and may store data generated or downloaded during the various programs are executed. In addition, the memory 1020 may store various commands and/or instructions for operating the processor 1010. The memory 1020 may include at least any one of an internal memory and an external memory.

According to various embodiments of the present invention, the memory 1020 may store various program modules for the pen input control in the desktop extension mode of the electronic device 1000.

Referring to FIG. 10B, the program module may include, for example, a kernel 1021, a framework 1023, an application program (or application) 1025, or the like.

According to an embodiment of the present invention, for example, the kernel 1021 may control or manage system resources (e.g., the processor 1010, the memory 130, etc.) used to execute an operation or function implemented in other programs (e.g., the framework 1023 or the application program 1025). According to an embodiment of the present invention, the kernel 1021 may include an input device driver 1021a. The input device driver 1021a may process input information which is input from an external input device (e.g., a mouse, a keyboard, a touchscreen, a stylus pen, etc.), and may transfer the processed information to an input management module (or input manager) 1023a of the framework 1023.

According to an embodiment of the present invention, the framework 1023 may perform, for example, a mediation role so that the application program 1025 can communicate with the kernel 1021 to exchange data. The framework 1023 may handle one or more task requests received from the application program 1025 according to a priority.

According to an embodiment of the present invention, the framework 1023 may include the input management module 1023a, a window management module 1023b, and an app management module 1023c. The input management module 1023a may process input information transferred from the input device driver 1021a into information that can be understood in the application 1025, and may transfer it to the window management module 1023b and/or the app management module 1023c. According to an embodiment of the present invention, the input management module 1023a may process a pen input which is input via the touchscreen display 1030 in accordance with a drawing mode (e.g., a first mode, a second mode, or a third mode) when the external display device is coupled. For example, the input management module 1023a may process a pen input by matching a window of an application displayed in an entire region or partial region of the external display device and at least partial region (e.g., an entire region or partial region) of the touchscreen display 1303.

The window management module 1023b may manage a size change of the window of the application. For example, when the user changes the window to a full screen mode, the window management module 1023b may change the window of the application to a full screen, and may transfer corresponding information to the input management module 1023a and the app management module 1023c.

According to an embodiment of the present invention, the application program 1025 may include, for example, a home, a dialer, a Short Message Service (SMS)/Multimedia Messaging Service (MMS), an Instant Message (IM), a browser, a camera, an alarm, a contact, a voice recognition, an e-mail, a calendar 381, a media player, an album, a health (e.g., measuring of a physical activity level, a blood sugar level, etc.), a drawing application, or the like. The application program 1025 may display an execution screen through a window corresponding to the entire region or partial region of the external display device.

The touchscreen display 1030 may be exposed through a first portion of the housing, and may provide an input function and an output function. For example, the touchscreen display 1030 may include a touch panel and a display panel. The display panel may be constructed of, for example, a Liquid Crystal Display (LCD), a Light Emitting Diode (LED) display, an Organic Light-Emitting Diode (OLED) display, a Micro Electro Mechanical System (MEMS) display, or an electronic paper display. The touch panel may detect (or recognize) a change of a physical property (capacity, frequency, etc.) caused by various touch inputs (e.g., a tap, a double tap, a touch, a touch movement, a multi touch, a pressure touch, etc.) using an input tool such as a stylus pen or the like, and may transfer it to the processor 1010. The touch panel may include a first panel (not shown) for detecting a touch using a finger and a second panel (not shown) for recognizing a stylus pen. The touch panel may further include a third panel (not shown) for detecting pressure.

The touchscreen display 1030 according to various embodiments of the present invention may turn the screen off when the electronic device 1000 is executed in the desktop extension mode. The touchscreen display 1030 according to various embodiments of the present invention may operate at least a partial region as a touch pad for receiving a user input when in the desktop extension mode. For example, when a pointing device (e.g., a mouse, a touchpad, etc.) is not coupled in the desktop extension mode, the user may use at least the partial region of the touchscreen display 1030 as the pointing device. At least the partial region of the touchscreen display 1030 according to an embodiment of the present invention may be matched to at least a partial region of the external display device. The touchscreen display 1030 according to various embodiments of the present invention may visually notify a set input region, as described in FIG. 7 and FIG. 8.

The communication circuit 1040 may be located inside the housing, and may perform wired communication and/or wireless communication. For example, the communication circuit 1040 may include at least one wireless communication circuit 1041 and/or at least one wired communication circuit 1042.

The wireless communication circuit 1041 may provide a wireless communication connection. For example, the wireless communication circuit 1041 may provide WiFi communication and/or Bluetooth communication or the like. The wireless communication circuit 1041 according to an embodiment of the present invention may support a connection of an external device such as a keyboard, a mouse, or the like. For example, the wireless communication circuit 1041 may receive a signal input from the mouse or the keyboard and provide it to the processor 1010.

The wireless communication circuit 1041 according to an embodiment of the present invention may receive information (e.g., database) for compatibility of the desktop extension mode with respect to an application (or app) installed in the electronic device 1000 from a server (not shown). The information may be received periodically, or received when the desktop extension mode is executed, or received when there is a user request.

According to some embodiments, the wireless communication circuit 1041 may support a wireless communication connection with an external display device. For example, the wireless communication circuit 1041 may support a wireless desktop extension mode.

The wired communication circuit 1042 may provide a wired communication connection. For example, the wired communication circuit 1042 may provide USB communication (e.g., USB type-C). The wired communication circuit 1042 according to an embodiment of the present invention may support wired communication with the external display device.

In order to display a screen including a plurality of icons on the external display device under the control of the processor 1010, the wired communication circuit 1042 according to various embodiments of the present invention may render the screen and transmit data related to the screen to the external display device.

The interface 1050 may be an interface device (e.g., an electrical connector) for a connection with the external display device or the docking device. For example, the interface 1050 may be a socket of a USB type-C protocol.

The detection circuit 1060 may detect a detachment or attachment of a stylus pen. The detection circuit 1060 may be a switch which is pressed when the stylus pen is attached and released when the stylus pen is detached, a magnetic sensor for detecting a magnet disposed at one side of the stylus pen, or the like. According to some embodiments, the detection circuit 1060 may be included inside the processor 1010.

Figure 11:
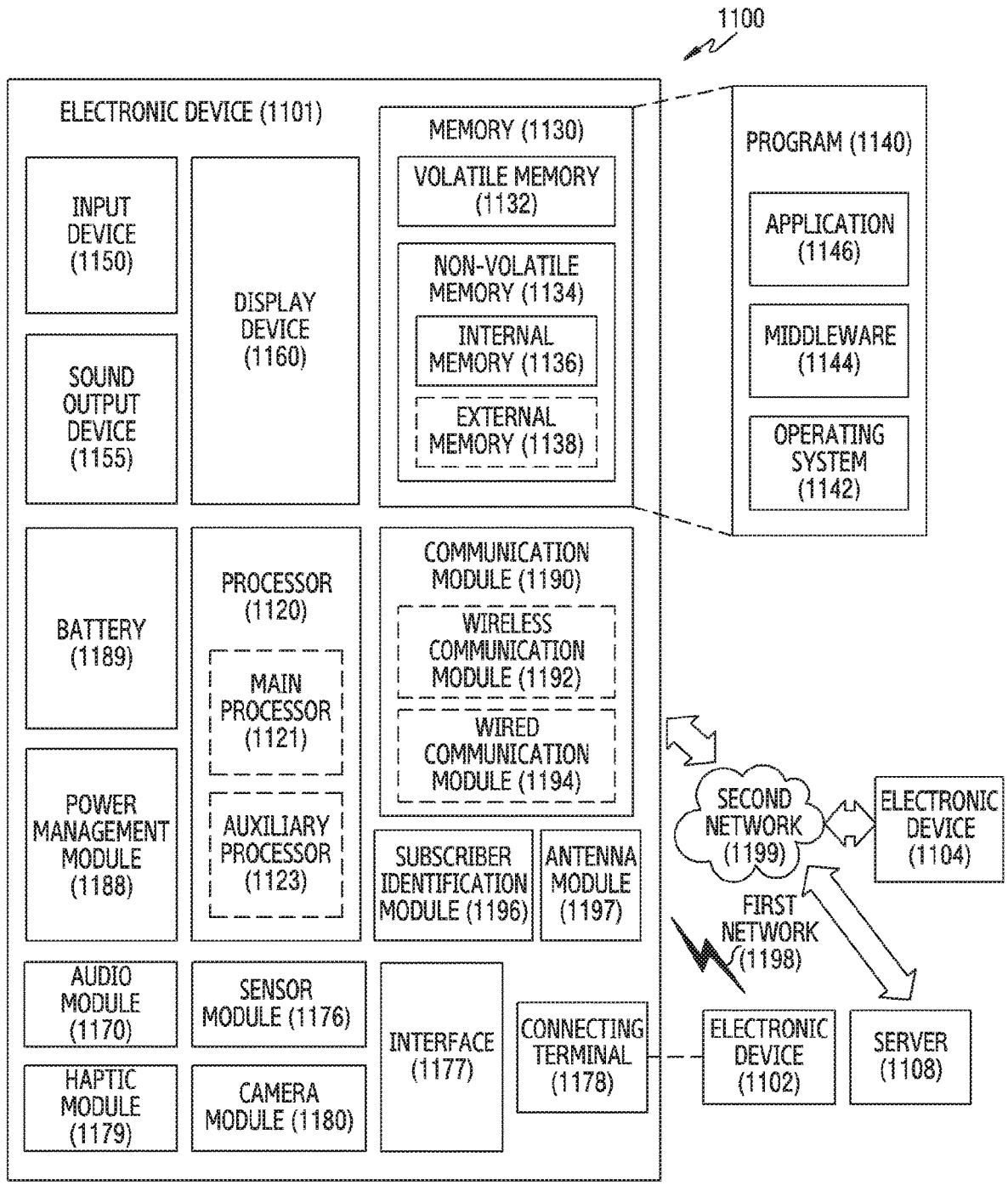
FIG. 11 is a block diagram of an electronic device in a network environment according to various embodiments of the present invention.

FIG. 11 is an exemplary view illustrating a network environment comprising an electronic device according to an embodiment of the present invention FIG. 11 is a block diagram illustrating an electronic device 1101 (e.g., the electronic device 100 of FIG. 1A and FIG. 1B, the electronic device 1000 of FIG. 10A) in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be integrated and implemented, for example, such as the sensor module 1176 (e.g., a fingerprint sensor, an iris sensor, or an illuminance sensor) embedded in the display device 1160 (e.g., a display).

The processor 1120 (e.g., the processor 1010 of FIG. 10A) may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 (e.g., the touchscreen display 130 of FIG. 1A and FIG. 1B, the touchscreen display 330 of FIG. 3A to FIG. 3C, the touchscreen display 530 of FIG. 5A to FIG. 5C, the touchscreen display 630 of FIG. 6A and FIG. 6B, the touchscreen display 730 of FIG. 7, the touchscreen display 830 of FIG. 8, the touchscreen display 1030 of FIG. 10A) may visually provide information to a user of the electronic device 1101. The display device 1160 may include, for example, a display, a hologram device, or a projector and control circuitry to control a corresponding one of the display, hologram device, and projector. According to an embodiment, the display device 1160 may include touch circuitry, or a pressure sensor adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or an external electronic device (e.g., an electronic device 1102) (e.g., a speaker or a headphone)) wiredly or wirelessly coupled with the electronic device 1101.

The sensor module 1176 may generate an electrical signal or data value corresponding to an operational state (e.g., power or temperature) of the electronic device 1101 or an environmental state external to the electronic device 1101. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 (e.g., the interface 1050 of FIG. 10A) may support a specified protocol for coupling with the external electronic device (e.g., the electronic device 1102) wiredly or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). The connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. The haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. The power management module 1188 may be implemented as at least part of, for example, a power management integrated circuit (PMIC).

The battery 1189 may supply power to at least one component of the electronic device 1101. The battery 1189 may include, for example, a primary cell which is not rechargeable, a secondary cell which is rechargeable, or a fuel cell.

The communication module 1190 (e.g., the communication circuit 1040 of FIG. 10A) may support establishing a wired communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a wired communication or a wireless communication. According to an embodiment, the communication module 1190 may include a wireless communication module 1192 (e.g., the wireless communication circuit 1041 of FIG. 10A) (e.g., a cellular communication module, a short-range wireless communication module, or a global navigation satellite system (GNSS) communication module) or a wired communication module 1194 (e.g., the wired communication circuit 1042 of FIG. 10A) (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single chip, or may be implemented as multi chips separate from each other.

The wireless communication module 1192 may identify and authenticate the electronic device 1101 in a communication network using subscriber information stored in the subscriber identification module 1196.

The antenna module 1197 may include one or more antennas to transmit or receive a signal or power to or from the outside. According to an embodiment, the communication module 1190 (e.g., the wireless communication module 1192) may transmit or receive the signal to or from the external electronic device through an antenna appropriate for a communication scheme.

Some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices. According to an embodiment, if the electronic device 1101 should perform a function or a service automatically, or by a request, the electronic device 1101, instead of, or in addition to, executing the function or the service, may request at least part associated with the function or the service to external electronic devices. The external electronic devices receiving the request may perform the function requested, or an additional function, and transfer an outcome of the performing to the electronic device 101. The electronic device 101 may provide the outcome, with or without further processing of the outcome. To that end, a cloud computing, distributed computing, or client-server computing technology, for example, may be used.

According to various example embodiments of the present invention, an electronic device (e.g., the electronic device 100 of FIG. 1A and FIG. 1B, the electronic device 1000 of FIG. 10A, the electronic device 1101 of FIG. 11) may comprise: a housing; a touch screen display (e.g., the touchscreen display 130 of FIG. 1A and FIG. 1B, the touchscreen display 330 of FIG. 3A to FIG. 3C, the touchscreen display 530 of FIG. 5A to FIG. 5C, the touchscreen display 630 of FIG. 6A and FIG. 6B, the touchscreen display 730 of FIG. 7, the touchscreen display 830 of FIG. 8, the touchscreen display 1030 of FIG. 10A, the display device 1160 of FIG. 11) exposed through a first portion of the housing; a wireless communication circuit (e.g., the wireless communication circuit 1041 of FIG. 10A, the wireless communication module 1192 of FIG. 11); an electrical connector (e.g., the interface 1050 of FIG. 10A, the connecting terminal 1178 of FIG. 11) exposed through a second portion of the housing; a processor (e.g., the processor 1010 of FIG. 10A, the processor 1120 of FIG. 11) operatively coupled with the touch screen display, the wireless communication circuit, and the connector; and a memory (e.g., the memory 1020 of FIG. 10A, the memory 1130 of FIG. 11) operatively coupled with the processor, wherein the memory stores instructions, when executed, for allowing the processor to: in a first operation, display a first screen including a plurality of icons indicating a plurality of application programs on the display in a first format when the electronic device is not coupled with an external display device (e.g., the external display device 300 of FIG. 1A and FIG. 1B); in a second operation, render a second screen including the plurality of icons in a second format without displaying the second screen on the display when the electronic device is coupled with the external display device via the connector, and provide data related to the second screen to the external display device via the connector so that the external display device displays the second screen; in a first mode of the second operation, receive a first touch input via the touchscreen display, determine first coordinates of the first touch input, and adapt the second screen with a first relation in which the first coordinates correspond to coordinates of an entire region of the external display device; and in a second mode of the second operation, receive a second touch input via the touchscreen display, determine second coordinates of the second touch input, and adapt the second screen with a second relation in which the second coordinates correspond to coordinates of not the entirety but part of the external display device.

According to various example embodiments, the instructions may allow the processor to switch the first mode to a third mode upon receiving a gesture input via the touchscreen display.

According to various example embodiments, the gesture input may be provided by using a stylus pen (e.g., the stylus pen 101 of FIG. 1A, the stylus pen 310 of FIG. 3A, the stylus pen 510 of FIGS. 5A and 5B).

According to various example embodiments, the instructions may allow the processor to display a user interface of a drawing application program at a partial region of the external display device, and switch the first mode to the second mode.

According to various example embodiments, the instructions may allow the processor to receive a first user input for selecting the second mode via the touchscreen display, and switch the first mode to the second mode upon receiving the first user input.

According to various example embodiments, the instructions may allow the processor to receive a second user input for selecting the first mode via the touchscreen display, and switch the second mode to the first mode upon receiving the second user input.

According to various example embodiments, the housing may further comprise a recess to which a stylus pen is detachably inserted. The instructions may allow the processor to determine whether the stylus pen is detached from the recess, and switch the first mode to the second mode based in part on the determination.

According to various example embodiments, the instructions may allow the processor to display a user interface of a drawing application program at a partial region of the external display device, identify whether to enlarge the user interface to a full screen, and enlarge the user interface to the full screen in response to allowing of the enlargement.

According to various example embodiments, the instructions may allow the processor to display a user interface of a drawing application program at a partial region of the external display device, and set a partial region of the touch screen display as an input region, by considering a ratio of a horizontal size and vertical size of the user interface.

According to various example embodiments, the instructions may allow the processor to display guide information indicating the set input region on the touchscreen display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present invention, the electronic devices are not limited to those described above.

It should be appreciated that various embodiments of the present invention and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun may include one or more of the things, unless the relevant context clearly indicates otherwise. As used herein, each of such phrases as "A or B," "at least one of A and/or B," "A, B, or C," or "at least one of A, B, and/or C," may include all possible combinations of the items enumerated together. As used herein, such terms as "1st," "2nd," "first" or "second" may modify a corresponding components regardless of an importance or an order, be used to distinguish a component from another, and does not limit the corresponding components. It is to be understood that if an element (e.g., a first element) is referred to, "(operatively or communicatively) connected with," or "connected to" another element (e.g., a second element), it means that the element may be coupled with the other element directly, or via other element (e.g., a third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., computer). The machine may invoke instructions stored in the storage medium, be operated to perform functions according to the instructions invoked, and include the electronic device (e.g., the electronic device 100, the electronic device 1000, the electronic device 1001) according to embodiments disclosed. If the instructions are executed by a processor (e.g., the processor 1010, the processor 1120), the processor may execute functions corresponding to the instructions directly or using other components under the control of the processor. The instructions may include a code generated or executed by a compiler or an interpreter. The machine-readable storage medium may be provided in the form of a non-transitory storage medium. Wherein, the term "non-transitory" simply means that the storage medium does not include a signal and is tangible, but does not differentiate between semi-permanently storing the data in the storage medium and temporarily storing the data in the storage medium.

According to an embodiment, a method according to various embodiments of the present invention may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play-Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) may include a single entity or multiple entities, and a part of the above-described components may be omitted, or other components may be added. Alternatively or additionally, the part of components (e.g., modules or programs) may be integrated into a single component, and may still perform a function of each component in the same or similar manner as they are performed by each component before the integration. According to various embodiments, operations performed by the module, the program, or another component may be carried out sequentially, in parallel, repeatedly, or heuristically, or at least part operation may be executed in a different order or omitted, or other operations may be added.

The embodiments disclosed in the present invention are suggested for easy explanation and understanding of the disclosed technical features, and are not intended to limit the scope of the present invention. Therefore, the scope of the present invention should be interpreted as including all changes or modified forms derived based on the technical idea of the present invention.

The invention claimed is:

1. An electronic device comprising:
a housing;
a touchscreen display exposed through a first portion of the housing;
a wireless communication circuit;
an electrical connector exposed through a second portion of the housing;
a processor operatively coupled with the touchscreen display, the wireless communication circuit, and the connector; and
a memory operatively coupled with the processor,
wherein the memory stores instructions, when executed, for allowing the processor to:
in a first operation, display a first screen including a plurality of icons indicating a plurality of application programs on the touchscreen display in a first format when the electronic device is not coupled with an external display device;
in a second operation, render a second screen including a plurality of icons in a second format, wherein visual information included in the second screen is not displayed on the touchscreen display when the electronic device is coupled with the external display device, and provide data related to the second screen to the external display device so that the external display device displays the second screen;
in a first mode of the second operation, receive a first touch input via the touchscreen display, determine first coordinates of the first touch input, and adapt the second screen with a first relation in which the first coordinates correspond to coordinates of an entire region of the external display device; and
in a second mode of the second operation, receive a second touch input via the touchscreen display, determine second coordinates of the second touch input, and adapt the second screen with a second relation in which the second coordinates correspond to coordinates of not the entirety but part of the external display device,
wherein, in the first mode of the second operation, an entire region of the touchscreen display is used to receive the first touch input and corresponds to the entire region of the external display device, and
wherein, in the second mode of the second operation, the entire region of the touchscreen display is used to receive the second touch input and corresponds to an entire region of a window of an application executed in a partial region of the external display device.

2. The electronic device of claim 1, wherein the instructions allow the processor to switch the first mode to a third mode upon receiving a gesture input via the touchscreen display.

3. The electronic device of claim 2, wherein the gesture input is provided by using a stylus pen.

4. The electronic device of claim 1, wherein the instructions allow the processor to:
display a user interface of a drawing application program at the partial region of the external display device; and
switch the first mode to the second mode.

5. The electronic device of claim 4, wherein the instructions allow the processor to:
receive a first user input for selecting the second mode via the touchscreen display; and
switch the first mode to the second mode upon receiving the first user input.

6. The electronic device of claim 5, wherein the instructions allow the processor to:
receive a second user input for selecting the first mode via the touchscreen display; and
switch the second mode to the first mode upon receiving the second user input.

7. The electronic device of claim 1,
wherein the housing further comprises a recess to which a stylus pen is detachably inserted, and
wherein the instructions allow the processor to:
determine whether the stylus pen is detached from the recess; and
switch the first mode to the second mode, based in part on the determination.

8. The electronic device of claim 1, wherein the instructions allow the processor to:
display a user interface of a drawing application program at the partial region of the external display device;
identify whether to enlarge the user interface to a full screen; and
enlarge the user interface to the full screen, in response to allowing of the enlargement.

9. The electronic device of claim 1, wherein the instructions allow the processor to:
display a user interface of a drawing application program at the partial region of the external display device; and
set a partial region of the touchscreen display as an input region, by considering a ratio of a horizontal size and vertical size of the user interface.

10. The electronic device of claim 9, wherein the instructions allow the processor to display guide information indicating the set input region on the touchscreen display.

11. A method of controlling an input of an electronic device, the method comprising:
displaying a first screen including a plurality of icons indicating a plurality of application programs on a touchscreen display in a first format when the electronic device is not coupled with an external display device; and
rendering a second screen including a plurality of icons in a second format, wherein visual information included in the second screen is not displayed on the touchscreen display when the electronic device is coupled with the external display device, and providing data related to the second screen to the external display device so that the external display device displays the second screen,
wherein the providing of the data related to the second screen to the external display device comprises:
activating a first mode to receive a first touch input via the touchscreen display, determine first coordinates of the first touch input, and adapt the second screen with a first relation in which the first coordinates correspond to coordinates of an entire region of the external display device; or
activating a second mode to receive a second touch input via the touchscreen display, determine second coordinates of the second touch input, and adapt the second screen with a second relation in which the second coordinates correspond to coordinates of not the entirety but part of the external display device,
wherein, in the first mode of the second operation, an entire region of the touchscreen display is used to receive the first touch input and corresponds to the entire region of the external display device, and
wherein, in the second mode of the second operation, the entire region of the touchscreen display is used to receive the second touch input and corresponds to an entire region of a window of an application executed in a partial region of the external display device.

12. The method of claim 11, further comprising switching the first mode to a third mode upon receiving a gesture input via the touchscreen display.

13. The method of claim 11, further comprising:
displaying a user interface of a drawing application program at the partial region of the external display device; and
switching the first mode to the second mode.

14. The method of claim 11, further comprising:
determining whether the stylus pen is detached from a recess constructed at a housing of the electronic device; and
switching the first mode to the second mode, based in part on the determination.

15. The method of claim 11, further comprising:
displaying a user interface of a drawing application program at the partial region of the external display device;
identifying whether to enlarge the user interface to a full screen; and
enlarging the user interface to a full screen, in response to allowing of the enlargement.

16. The method of claim 12, wherein the gesture input may be provided using a stylus pen.

17. The method of claim 13, further comprising:
receiving a first user input for selecting the second mode via the touchscreen display; and
switching the first mode to the second mode upon receiving the first user input.

18. The method of claim 17, further comprising:
receiving a second user input for selecting the first mode via the touchscreen display; and
switching the second mode to the first mode upon receiving the second user input.

19. The method of claim 11, further comprising:
displaying a user interface of a drawing application program at the partial region of the external display device; and
setting a partial region of the touchscreen display as an input region, by considering a ratio of a horizontal size and vertical size of the user interface.

20. The method of claim 19, further comprising:
displaying guide information indicating the set input region on the touchscreen display.

\* \* \* \* \*